May 31, 1966 G. W. OFFENSEND ETAL 3,253,359
VIEWING APPARATUS
Original Filed Oct. 31, 1960 6 Sheets-Sheet 1

GLEN W. OFFENSEND
NORMAN J. ROSENBURGH
JOHN C. HAELEN
INVENTORS

BY
ATTORNEYS

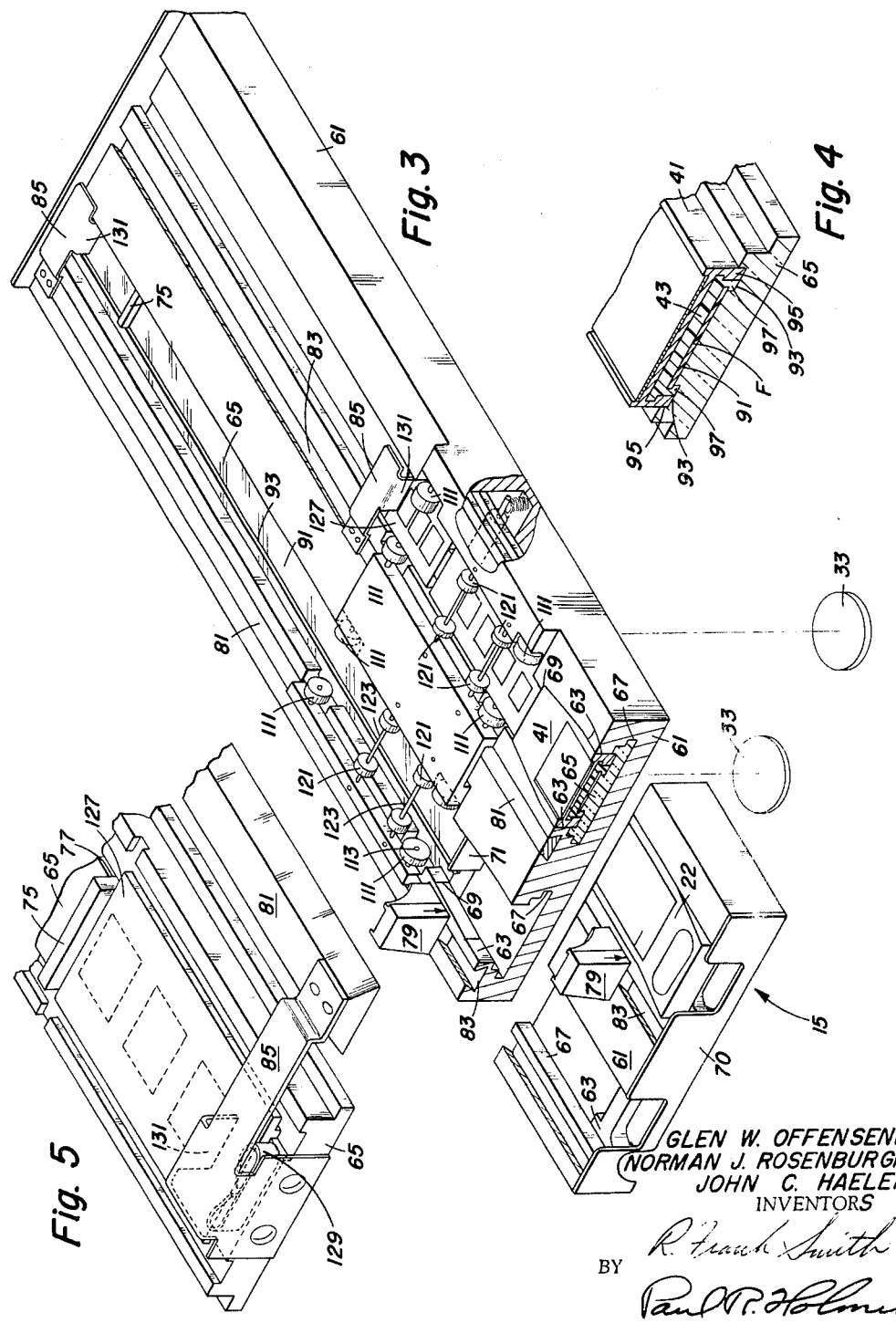

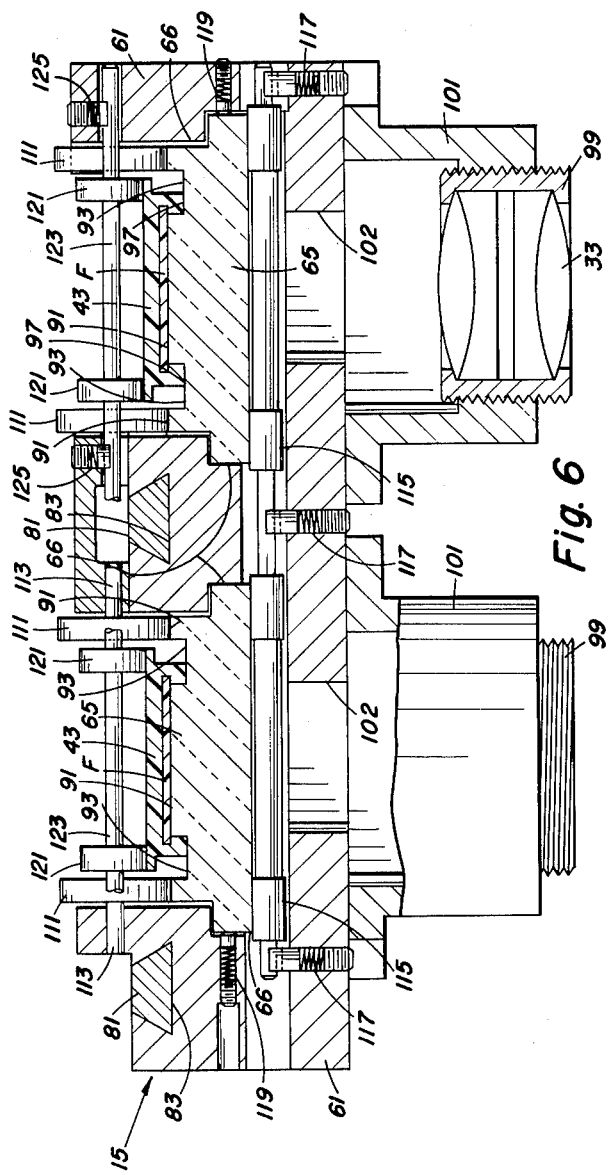

May 31, 1966 G. W. OFFENSEND ETAL 3,253,359
VIEWING APPARATUS
Original Filed Oct. 31, 1960 6 Sheets-Sheet 4
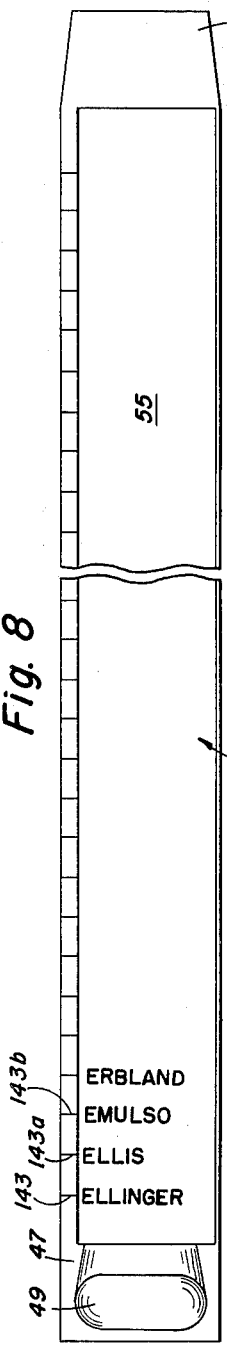
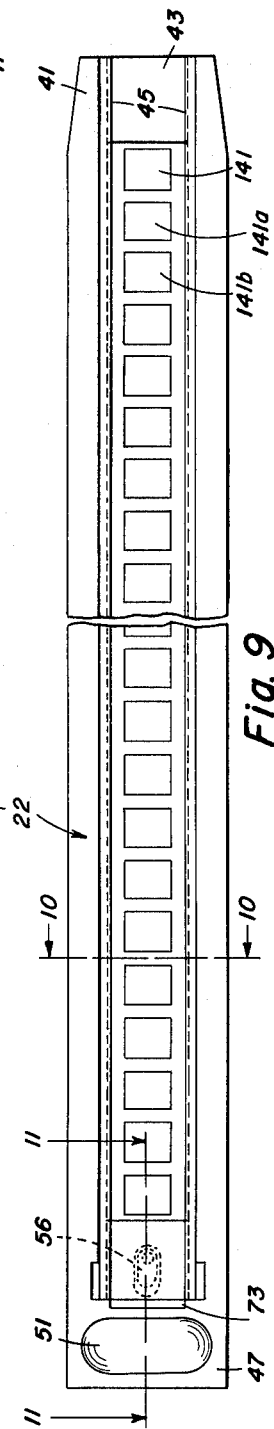
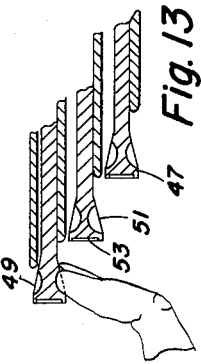
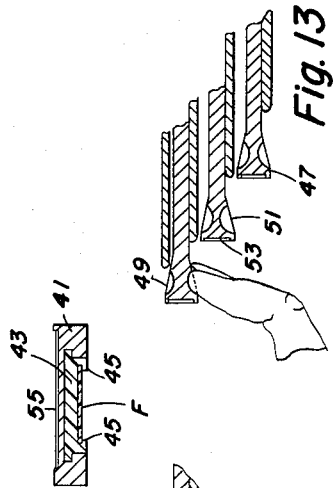
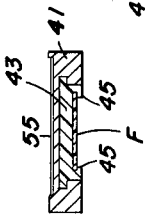
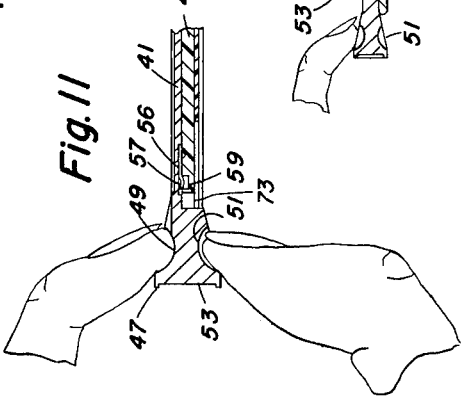
GLEN W. OFFENSEND
NORMAN J. ROSENBURGH
JOHN C. HAELEN
INVENTORS
BY R. Frank Smith
Paul P. Holmes
ATTORNEYS May 31, 1966    G. W. OFFENSEND ET AL    3,253,359
VIEWING APPARATUS
Original Filed Oct. 31, 1960    6 Sheets-Sheet 5

DAILY ADDENDUM IMAGE
DETAIL

GLEN W. OFFENSEND
NORMAN J. ROSENBURGH
JOHN C. HAELEN
INVENTORS

BY

ATTORNEYS

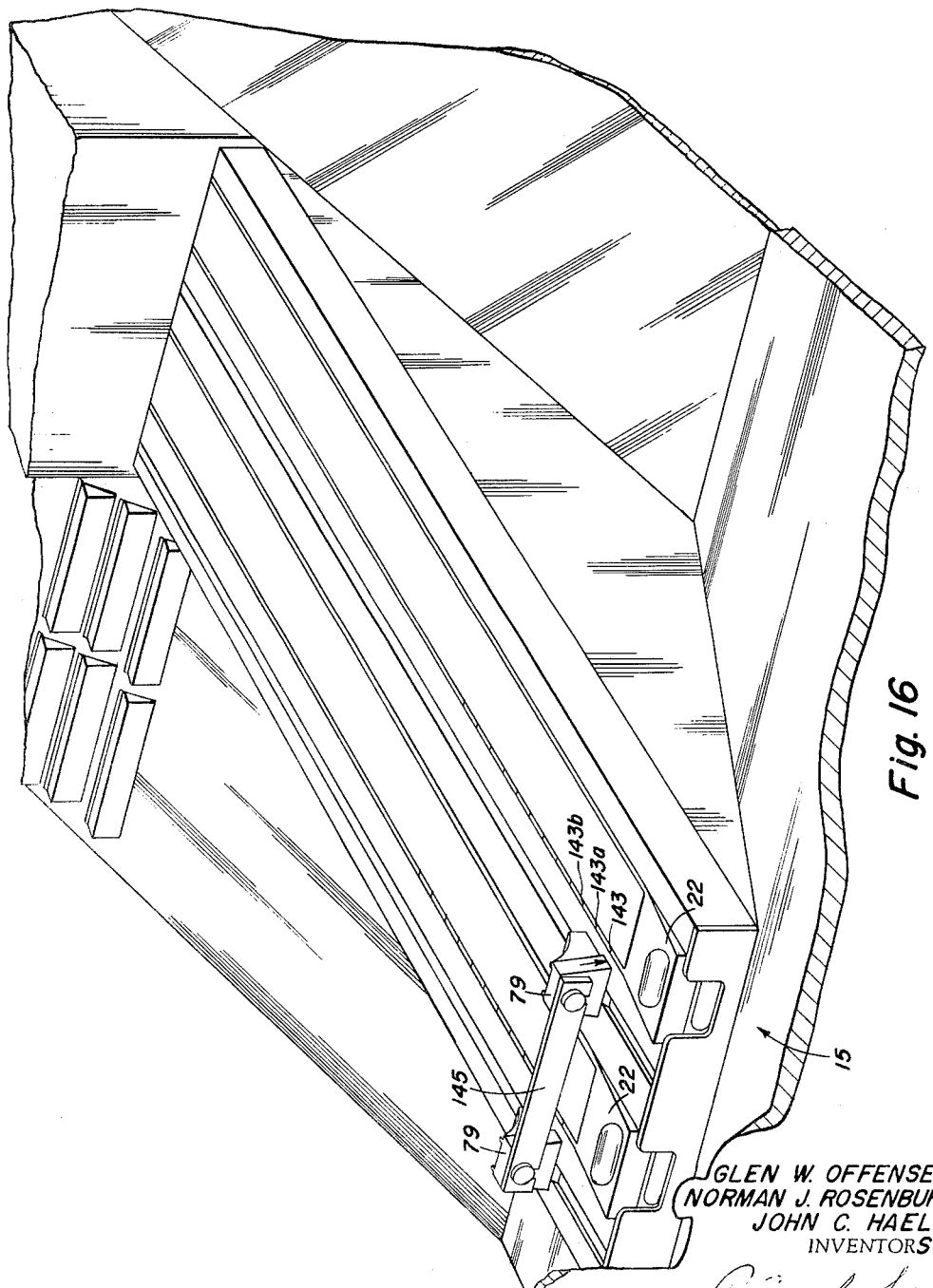

United States Patent Office 3,253,359
Patented May 31, 1966

3,253,359
VIEWING APPARATUS
Glen W. Offensend, Norman J. Rosenburgh, and John C. Haelen, Rochester, N.Y., assignors to Eastman Kodak Company, Rochester, N.Y., a corporation of New Jersey
Original application Oct. 31, 1960, Ser. No. 66,075. Divided and this application Feb. 10, 1964, Ser. No. 343,579
5 Claims. (Cl. 40—152)

This invention relates to an apparatus for viewing images and more particularly to an apparatus for viewing selected images carried on and projected from a relatively flat image bearing strip onto a viewing screen. This application is a division of our application Serial No. 66,075 filed on October 31, 1960, and entitled "Viewing Apparatus."

Broadly, the viewing apparatus of the present invention is designed to permit rapid location and projection for viewing of any given image from amongst many. The apparatus herein disclosed was specifically designed for use in telephone exchanges to provide rapid look-up of telephone subscriber listings. While the viewing apparatus is hereinafter described as it might be used for such telephone listing look-up, it will be readily apparent to those skilled in the art that the novel features of the present invention could be easily and advantageously adapted for use in many other situations where quick access and reference to recorded information is a desired feature. In accordance with the present invention, images of prepared telephone subscriber listings are recorded in alphabetic succession on rolls of microfilm. The rolls of film are cut into strips approximately one foot in length which are mounted in individual plastic strip holders. The strip holders comprise an inner holder which is preferably transparent and which is adapted to receive a single strip of film and an outer holder which is adapted to slidably receive the inner holder. The outer holder is provided on one end with a suitable index which designates the particular group of telephone subscriber listings which are carried on a film strip within the inner holder which is associated with that strip holder. The outer holder also carries another index which designates the particular groups of telephone subscriber listings which are carried in the successive images on the film strip. This latter index is arranged to cooperate with a transport mechanism in the viewing apparatus which is adapted to receive the strip holder and to advance the inner holder with the film strip therein in image projecting relation to the optical projection system. The transport mechanism includes a transparent platen having a surface on which the film strip to be viewed is carried. The platen is guided for movement in the viewing apparatus with the film contacted surface moving in the focal plane of the optical projection system. The film strip, the inner holder in which the film strip is carried, and the platen move together as a unit in the viewing apparatus. Because the film strip and platen move as a unit, there is no tendency to scratch the film surface by relative movement therebetween during the positioning of a given image in image projecting relation to the viewer optical projection system of the viewing apparatus.

The viewing apparatus of the present invention also comprises a novel arrangement of viewing screen, transport mechanism, and strip holder storage area. When the viewing apparatus of the present invention is used for telephone subscriber look-up in large metropolitan areas, many strip holders are required in order to have a complete listing available for the operator's selection. In such instances it is necessary to have the complete file of strip holders within the operator's reach in order to facilitate and expedite look-up of the information requested. Accordingly, the viewing apparatus of the present invention utilizes a housing in which the viewing screen is conveniently mounted in a prominent position on the front side of the viewing apparatus, the transport mechanism is positioned at the side of the screen, and a strip holder storage area comprised of individual strip holder receiving compartments, is arranged on opposite sides of the viewing screen and transport mechanism, and above the viewing screen.

The primary object of the present invention is, therefore, to provide a viewing apparatus adapted to project for viewing an image carried on an image bearing strip.

Another object of the present invention is to provide a viewing apparatus adapted to selectively receive one or more image bearing strips and to project for viewing selected images carried on said strips.

Still another object of the present invention is to provide a viewing apparatus adapted to selectively receive one or more image bearing strips and to project selected images carried by said strips simultaneously and in side-by-side relation onto a viewing screen.

Yet another object of the present invention is to provide a strip holder for storing and facilitating the handling of an image bearing strip.

Still another object of the present invention is to provide a strip holder for receiving and retaining an image bearing strip and bearing identifying indicia for visually differentiating the holder from other similar holders.

Yet another object of the present invention is to provide a strip holder for receiving and facilitating handling of an image bearing strip, and bearing identifying indicia by which it may be visually differentiated from other similar holders, and bearing other indicia for visually designating the images and their sequence on the strip.

Still another object of the present invention is to provide a viewing apparatus comprising a strip supporting surface which is movable in the focal plane of the optical projection system of the apparatus whereby the surface and an image bearing strip carried thereby may be moved as a unit in said focal plane to reduce scratching of the strip.

Yet another object of the present invention is to provide an apparatus for viewing selected images carried on one of a plurality of image bearing strips and comprising a housing having an accessible storage area formed at the front of the viewing apparatus for receiving said strips.

Still other objects and advantages of the present invention will become readily apparent to those skilled in the art from the following description with reference to the drawings in which like characters denote like parts and wherein:

FIGS. 3, 4, 5, 6 and 7 are detail views of the transport mechanism made in accordance with the present invention and utilized in the viewing apparatus shown in FIG. 1;

FIGS. 8, 9, 10, 11, 12 and 13 are detail views of the strip holder of the present invention which is designed for use in conjunction with the viewing apparatus of FIG. 1.

FIG. 16 illustrates a transport mechanism similar to the one shown in FIG. 3 but adapted to move simultaneously two image bearing strips in the viewing apparatus.

Figure 1:
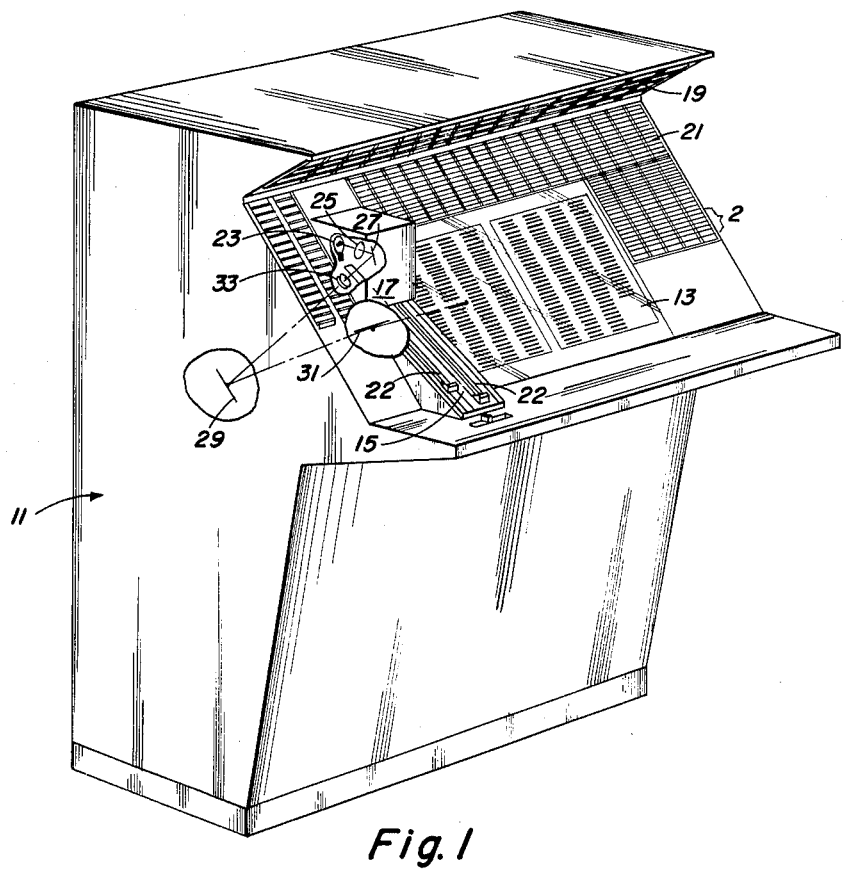
FIG. 1 is a picture view showing the viewing apparatus of the present invention.
Figure 2:
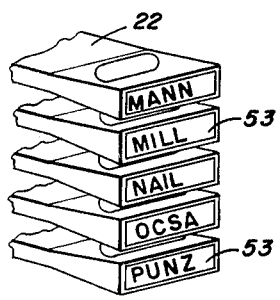
FIG. 2 is an enlarged view of the area designated within bracket 2 in FIG. 1.

The viewing apparatus illustrated in FIG. 1 comprises a housing generally designated by the numeral 11 having a viewing screen 13 mounted in a prominent position at the front of the housing, a transport mechanism 15 and a lamp housing 17 positioned at one side of the viewing screen, and upper and lower storage areas 19 and 21, respectively. The areas 19 and 21 are compartmented and each individual compartment is adapted to receive a strip holder 22. Each strip holder carries a unique identifying indicia on its outer end so that each holder may be visually differentiated from other holders in the various compartments of the storage areas. This feature is best shown in FIG. 2. The transport mechanism, which will be hereinafter more fully described, is adapted to selectively receive one or two strip holders and to move the image bearing strip carried within each holder in the focal plane of the optical projection system of the viewing apparatus. The optical projection system comprises two separate image projection systems, only one of which is schematically shown in FIG. 1 and is adapted to selectively project an image on either strip or an image on both strips in side-by-side relation onto the viewing screen. Each such image projection system comprises a lamp 23, a condensing lens 25, mirrors 27, 29 and 31 and a projection lens 33.

The strip holders 22 are shown in FIGS. 8 through 13 and comprise an outer holder 41 and an inner holder 43. From FIG. 10 which is a cross-sectional view of holder 22 taken along line 10—10 of FIG. 9, it will be seen that outer holder 41 has a T-shaped slot extending longitudinally of the holder for receiving and slidably retaining inner holder 43 within the outer holder. An image bearing strip, preferably a film strip F, is retained in inner holder 43 by means of the overlying projections 45 which permit strip F to be removed and interchanged with another when desired. In order to facilitate handling of the strip holder 22, the outer holder 41 is provided on one end with an enlarged flared portion 47 having a pair of oval "finger" depressions 49 and 51. These depressions allow the operator to grasp and carry the holder 22 with a finger and thumb as illustrated in FIG. 11 or to pull out the holder from its storage compartment with a forefinger as illustrated in FIGS. 12 and 13. The end of the flared portion 47, which is visible when holder 22 is positioned in its compartment in the storage area 19 or 21, is provided with a surface 53 for receiving indicia which uniquely identify each strip holder (see FIG. 2). The outer holder 41 also includes a longitudinal area 55 for receiving indicia which identify the respective images carried on the film strip F in the associated inner holder 43. In the viewing apparatus specifically disclosed herein, each image on each film strip F contains a list of subscriber names and telephone numbers in much the same arrangement as they appear on a page of the usual printed telephone book. The indicia on surface 55 could be the first name which appears in each image and the indicia provided on surface 53 could be the first name appearing in the first image on the particular film strip F within that holder 22. In order to resiliently lock the inner holder 43 within the outer holder 41 so that the holders 22 do not accidentally separate during removal from the storage compartments or transferral to the transport mechanism 15, a leaf spring 56 is attached on one end by means of a pin, not shown, to an under surface of outer holder 41 and on the other end is formed with a detent 57 which engages the recess 59 in the inner holder 43. Obviously, the locking action of detent 57 in recess 59 does not preclude the intentional moving of the inner holder 43 with respect to the outer holder 41, when holder 22 is positioned in the transport mechanism 15. FIGS. 12 and 13 are partial cross-sectional views which show the strip holders 22 as they normally rest in the individual compartments of the storage areas; FIG. 12 being a section through storage area 21 and FIG. 13 through area 19.

Transport mechanism 15 as illustrated in FIGS. 3, 4, 5, 6, and 7 comprises a base member 61 which has two slots 63 positioned in side-by-side relation for selectively receiving one or two strip holders 22. A portion of the lower end of transport mechanism 15 is not shown in FIG. 3 in order to better illustrate the remaining structure of the present invention. For the same reason, a strip holder 22 is shown in position in only one of the slots 63 of the transport mechanism. The transport mechanism also comprises two platens 65 formed of glass or other transparent material which are slidably received in slots 67 formed in base member 61 and underlying slots 63.

Outer holders 41 do not move within slots 63, the end of each slot being provided with projections 69 for engaging the end of each holder received therein. Slots 67, on the other hand, extend all the way through base member 61 to permit the platens 65 to move from the lower end 70 of the transport mechanism where they first engage the inner holders 43 when the holders 22 are placed in slots 63 to a remote position in base member 61 such as illustrated in the left-hand slot 67. When in this remote position the last image contained on the film strip F within the holder 22 is in image projecting relation to the optical projection system. Thus, slots 67 permit the complete scanning of the film strips in the viewing apparatus.

An upstanding detent 71 is provided on the lower end of each platen 65 for moving the inner holder 43 in slot 63 and with respect to outer holder 41. With the platen 65 at the lower end 70 of the transport mechanism, detent 71 enters the space 73 formed in outer holder 41 behind inner holder 43 (see FIG. 9). The other end of the inner holder 43 abuts a key 75 which is carried in a keyway 77 formed in the top surface of platen 65. Each platen 65 is mechanically linked to a slide actuator 79 through a slide 81 which moves in a slot 83 formed in base member 61 parallel to slots 67 and a bracket 85 which connects the end of each slide 81 and the end of platen 65 as best illustrated in FIG. 5. Thus, it will be apparent that movement of one of the slide actuators 79 will automatically carry with it the associated platen 65 and, provided a holder 22 has been properly positioned in the transport mechanism, the film strip F in the inner holder 43. The top surface 91 of platen 65 is supported for movement in the focal plane of the projection lenses 33. The film strip F when it is positioned in inner holder 43 is located with its emulsion side down so that when the inner holder is located on platen 65 the emulsion side of the film strip is in close contact to the surface 91 and the images on the film strip will lie in the focal plane of the projection lenses 33 as the platen 65 is moved in slot 67 of base member 61. It is also important that inner holder 43 be held on the platen 65 so that it does not slip from side to side on the surface of the platen. This end is accomplished by providing two grooves 93 running longitudinally of the platen 65. As will be seen from FIGS. 4 and 10, outer holder 41 is formed with shoulders 95 and inner holder 43 is formed with shoulders 97. The shoulders 95 and 97 run longitudinally of holder 22 adjacent to each of the longitudinal edges of film strip F and the combined width of shoulders 95 and 97 is such that they may be received in grooves 93 in platen 65. Thus, shoulders 97 effectively locate the inner holder 43 on the surface 91 of platen 65 and prevent the film strip F from slipping sidewise thereon during scanning of the film strip. As shown in FIG. 6, the projection lenses 33 are carried in lens barrels 99 which are threadedly received in the housings 101. Housings 101 are rigidly fastened to the base member 61 by bolts or other conventional means. An aperture 102 is provided in the base member 61 in line with each of the projection lenses 33 to permit images carried on the film strip F to be projected by the optical projection system onto the viewing screen 13.

In order to assure that the surface 91 of each platen 65 moves in the focal plane of the optical projection system, a series of rollers 111 are mounted on shafts 113 so that the peripheral surfaces of rollers 111 engage surface 91 of the platens 65, as best illustrated in FIG. 6. In order to maintain the surfaces 91 in engagement with the peripheral surfaces of rollers 111, some smaller rollers 115 are mounted to engage the bottom surface on platens 65. Rollers 115 are resiliently urged by means of the springs 117 toward the rollers 111. At the same time springs 119 urge the platens 65 toward the middle of the base member 61 in contact with the inner sides 66 of slot 67. Rollers 121 are mounted on shafts 123 which are resiliently urged by springs 125 toward the upper surface of inner holder 43 to ensure that the emusion surface of each film strip F is maintained in close contact with the surface 91 when positioned thereon. The compression springs 117, 119 and 125 may be adjusted by changing the position of the set screws which are associated therewith, as is well known in the art.

It has been found that there are certain numbers such as, for example, police stations, fire houses, hospitals and other emergency services to which an operator in a telephone information exchange must frequently refer. The viewing apparatus of the present invention is adapted to receive a short strip of film bearing such images within a relatively short transparent holder 127 which is structurally similar to inner holder 43. Holder 127 is retained on the surface 91 of platen 65 between key 75 and the remote end of the platen bracket 85 (see FIG 5). Holder 127 is urged toward key 75 by means of a spring 129 and is held down on the surface 91 of platen 65 of an extension 131 which is formed on the bracket 85. Holder 127 is designed to be more or less permanently carried on the platen 65 but, of course, can be removed when it is necessary to change the images which are recorded on the film strip carried within the holder 127. Up to three images can be recorded on the film strip within holder 127. One of the three images in either or both holders 127 is arranged with respect to platens 65 to be in image projecting relation to the optical projection system when the slide actuator 79 is moved to its bottom or start position in base member 61, that is, the position in which detent 71 engages space 73 in holder 22 when the holder is first placed in the transport mechanism 15. Thus, it is always possible for the operator to view one or more of the images on the film strip in holder 127 by merely positioning the slide actuator 79 in that bottom position or one slightly spaced therefrom. Such images may be projected and viewed regardless of whether a holder 22 is then positioned in the transport mechanism 15.

The operation of the viewing apparatus of the present invention, as it might be used for telephone subscriber look-up will not be described. It will be assumed that a complete telephone subscriber listing has been photographically recorded on suitable microfilm, each image being similar to that of a printed page in a printed telephone book. The film is cut into appropriate lengths and each individual strip is placed within an inner holder 43 with the emulsion surface down. Each inner holder is associated with an outer holder 41 to form a complete holder 22. The first name to appear in the first image, that is, the image designated by the numeral 141 in FIG. 9 is marked on area 55 at the position indicated by the index line 143 in FIG. 8. That same first name would also be marked on surface 53. The first name appearing in each successive image 141a, 141b etc. on the film strip F would be recorded opposite successive index marks 143a, 143b, etc. on area 55. The distance between marks 143, 143a, 143b etc. is equal to the distance between centers of successive images 141, 141a, 141b etc. Thus, the images and their position on the film strip F are designated by the marks 143, 143a, 143b etc. and the names on area 55 opposite such marks. Thus, when the pointer on slide actuator 79 is positioned opposite a particular mark 143, 143a, 143b etc., the image 141, 141a, 141b etc. which includes the same name which is opposite such mark, is in image projecting relation to the optical projection system of the viewing apparatus and is projected onto the viewing screen 13. All of the holders 22 are alphabetically arranged in the storage areas 19 and 21 in accordance with the name carried on surfaces 53 so that the identifying names on surfaces 53 are visible to the operator. Upon receiving an inquiry as to a telephone number of a given subscriber, the operator selects the appropriate holder 22 which includes the subscriber's name and places it in slot 63 of the transport mechanism 15 making sure that slide actuator 79 is in its bottom position so that detent 71 will engage in space 73. The operator then moves the slide actuator to a point opposite the name on area 55 which would most nearly alphabetically precede the given name and the image of the page which contains the given name would be projected onto the viewing screen 13. Since there are two separate holder receiving slots 63 in the transport mechanism 15 and two separate image projection systems, it would not be necessary for the operator to replace one holder 22 before inserting a second holder in the transport mechanism in response to a second information request. Since the operator is able to simultaneously manipulate two holders 22, it is possible for the operator to be putting away one holder while inserting another holder in the transport mechanism or while moving the slide actuator 79 to a desired position.

Figure 14:
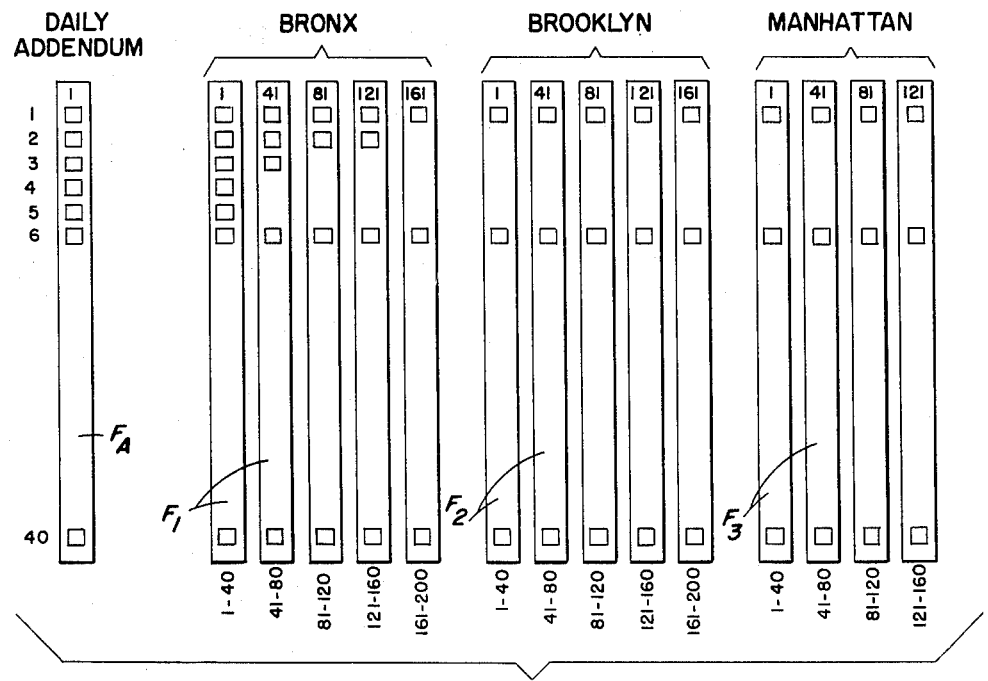
FIGS. 14 and 15 illustrate several film strips showing how they may be utilized according to one embodiment of the present invention.
Figure 15:
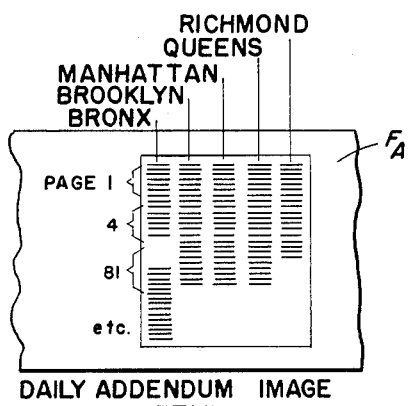

Still another possible mode of operation is disclosed in FIG. 16. The transport mechanism 15 which is disclosed in FIG. 16 is identical in every respect to the one shown in FIG. 3 of the drawings except that the two slide actuators 79 are mechanically interconnected by a rigid link 145 so that the platens 65 move simultaneously and as a unit. The advantage obtained by this mechanism will be explained with reference to FIGS. 14 and 15. One of the problems faced by telephone companies is the continual changing, adding, or dropping of subscriber names and numbers. In a metropolitan area such as, for example, New York city, it is necessary to prepare printed multipaged supplements to include changes made during each preceding day. In accordance with the present invention, this problem could be readily handled by photographing a daily addendum on a single film strip of a length to fit one of the inner holders 43. In FIG. 14 $F_1$ designates film strips which for puposes of illustration carry some of the subscriber listings for the Bronx. $F_2$ indicates film strips which carry images of some of the subscriber listings for Brooklyn, and $F_3$ designates carrying images of some of the subscriber listings for the Borough of Manhattan. Other boroughs might be carried on similar film strips F4 and F5, not shown. Each film strip which is of a length to be received in inner holder 43 can, if about twelve (12) inches long, carry forty images. Thus, the first image on each strip for each borough would be image number 1, 41, 81 etc. According to the present invention, all of the changes in subscriber listings which have occurred during the preceding day or other convenient longer period, would be photographed on a strip of film such as $Fa$. In the first image on film strip $Fa$, all of the subscriber listing changes would be recorded and designated, which changes have occurred in the listings represented in the first images carried on all of the film strips F1, F2, F3 etc. for all of the boroughs in the subscriber district. In the second image on the daily addendum is recorded all the changes which have occurred in the subscriber listings represented in the second images carried on all of the film strips F1, F2, F3 etc. Thus, each image in the daily addendum contains all of the changes for all of the images similarly positioned on the strips F1, F2, F3 etc., for the subscriber district. As indicated in FIG. 15, each column in each image could be devoted to a separate borough and the various images in which changes have occurred within that borough could be denoted in the column by numbers, spaces division lines or other similar means. It will now be readily apparent that when the holder 22 carrying the daily addendum film strip Fa, is placed in the transport mechanism 15, illustrated in FIG. 16, and the operator thereafter places one of the film holders 22 carrying one of the regular film strips such as F1, F2, F3, etc., in the other receiving slot 63 of the transport mechanism, movement of the slide actuator 79 to the given index mark 143, 143a, 143b etc. results in both the image containing the desired subscriber listing and also the corresponding image on the daily addendum strip bearing any changes which have been made in such listing, appearing in side-by-side relation on the viewing screen 13.

The operator is able to look at both projected images and determine whether or not a change has been made in the particular subscriber listing in question and the need for scanning a separate multipage printed publication containing such subscriber changes is no longer required. Obviously, the holder 22 bearing the daily addendum film strip Fa is left in the transport mechanism 15 at all times for immediate reference purposes.

It will now be apparent to those skilled in the art that we have disclosed a viewing apparatus adapted to project for viewing, images carried on one or more image bearing strips, strip holders for storing and facilitating the handling of such image bearing strips, a transport mechanism including a surface on which one or more image bearing strips are held for movement through the focal plane of the optical projection system of the viewing apparatus, and a housing for such viewing apparatus having accessible storage areas for strip holders which storage areas is located in front of the operator adjacent to the viewing screen and transport mechanism. While only one embodiment of the present invention has been specifically described, it is realized that many modifications and variations are possible and will be readily apparent to those skilled in the art from the foregoing description, which is intended, therefore, to be illustrative only and the scope of the invention is defined in the appended claims.

Having now particularly described our invention, what we desire to secure by Letters Patent of the United States and what we claim is:

1. A strip holder providing storage for an image bearing strip and facilitating the viewing of the strip while partially withdrawn from the holder, said strip holder comprising:
    (a) an elongated outer holder having a slot open on the underside thereof and extending longitudinally and through one end thereof, said slot being substantially T-shaped in cross-section and of uniform size throughout its length with the narrow portion of the cross-section intersecting said underside of the outer holder, the other end of said outer holder having an enlarged flared portion formed with finger depressions therein to facilitate manual gripping and handling of the strip holder;
    (b) a transparent inner holder slidably mounted in said outer holder and having an external cross-sectional configuration which is substantially complementary to said T-shaped slot, said inner holder further having a groove of uniform cross-section extending longitudinally within said inner holder, said groove having undercut portions so that portions of said inner holder are adapted to overlie the longitudinal edges of said strip to position and retain said strip on said inner holder; and
    (c) means operatively associated with said inner and said outer holder for resiliently locking said inner holder in a retracted position in which said inner holder and said strip are disposed fully within the outer holder;
    (d) whereby images on said strip are viewed by sliding the inner holder along the T-shaped slot in the outer holder and through the one end thereof, so as to expose a selected portion of the inner holder and of the strip carried thereby, another portion of the inner holder being retained with the outer holder.

2. A strip holder in accordance with claim 1 and wherein said locking means comprise a leaf spring attached on one end to said outer holder and having on the other end thereof a detent for resiliently engaging a depression formed in said inner holder.

3. A strip holder in accordance with claim 2 wherein said other end of said outer holder includes an end surface for receiving indicia to identify said strip holder from similar holders and wherein the longitudinal surface of said outer holder opposite said slot includes indicia for identifying portions of said strip.

4. A strip holder providing storage for an image bearing film strip and facilitating the viewing of the strip while partially withdrawn from the holder, said strip holder comprising:
    (a) an elongated opaque outer holder having a slot open on the underside of said outer holder and extending longitudinally and through one end thereof, said slot being substantially T-shaped in cross-section and of uniform size throughout its length with the narrow portion of the cross-section intersecting said underside of the outer holder, and
    (b) a transparent inner holder slidably mounted in the outer holder and having an external cross-sectional configuration which is substantially complementary to the T-shaped slot so that the inner holder is longitudinally slidable relative to the said outer holder when mounted in said T-shaped slot,
    (c) said inner holder comprising a groove of uniform cross-section having recessed portions, said groove extending longitudinally of said inner holder for receiving and retaining an image bearing strip so that the strip and inner holder are movable as a unit in said T-shaped slot,
    (d) whereby said inner holder can be engaged through said T-shaped slot for movement through said one end of said opaque outer holder so as to expose a selected portion of said film strip for trans illumination through said transparent inner holder.

5. A strip holder in accordance with claim 4 further comprising means operatively associated with said inner and outer holders for resiliently locking said inner holder with respect to said outer holder, said cooperating portions of said locking means being so located that when resiliently locked together said inner holder is completely within said outer holder and a small space is formed between the closed end of said slot in the outer holder and the adjacent end of said inner holder so that said adjacent end can be conveniently engaged for sliding said inner holder from within said outer holder.

References Cited by the Examiner
UNITED STATES PATENTS

| | | | |
|---|---|---|---|
| 1,288,395 | 12/1918 | Duncan | 40—16 X |
| 1,465,244 | 8/1923 | Hager | 40—64 |
| 2,572,735 | 10/1951 | Kugel | 40—159 |
| 2,575,913 | 11/1951 | Eastman | 40—17 |
| 2,599,311 | 6/1952 | Anderson | 210—18 |
| 2,640,287 | 6/1953 | Lacoursiere | 40—16 X |

EUGENE R. CAPOZIO, *Primary Examiner.*

JEROME SCHNALL, *Examiner.*

WENCESLAO J. CONTRERAS, *Assistant Examiner.*